(12) United States Patent
Derschmidt et al.

(10) Patent No.: US 10,634,138 B2
(45) Date of Patent: Apr. 28, 2020

(54) BIDIRECTIONALLY FLOW-IMPINGED DEVICE FOR MEASURING FLOW PROCESSES OF FLUIDS

(71) Applicant: AVL LIST GMBH, Graz (AT)

(72) Inventors: Otfried Derschmidt, Graz (AT); Heribert Kammerstetter, Salzburg (AT)

(73) Assignee: AVL LIST GMBH, Graz (AT)

( * ) Notice: Subject to any disclaimer, the term of this patent is extended or adjusted under 35 U.S.C. 154(b) by 163 days.

(21) Appl. No.: 15/759,522

(22) PCT Filed: Sep. 15, 2016

(86) PCT No.: PCT/EP2016/071769
§ 371 (c)(1),
(2) Date: Mar. 13, 2018

(87) PCT Pub. No.: WO2017/046209
PCT Pub. Date: Mar. 23, 2017

(65) Prior Publication Data
US 2019/0145409 A1   May 16, 2019

(30) Foreign Application Priority Data
Sep. 15, 2015 (AT) ...................................... 602/2015

(51) Int. Cl.
*F04C 15/06* (2006.01)
*F04C 2/10* (2006.01)
(Continued)

(52) U.S. Cl.
CPC ................ *F04C 15/06* (2013.01); *F04C 2/10* (2013.01); *F04C 2/344* (2013.01); *G01F 3/10* (2013.01);
(Continued)

(58) Field of Classification Search
CPC .. F04C 15/06; F04C 2/10; F04C 2/344; F04C 2220/24; F04C 2270/16; G01F 15/02;
(Continued)

(56) References Cited

U.S. PATENT DOCUMENTS 3,273,502 A   9/1966  Martz
3,633,420 A   1/1972  Holzem
(Continued)

FOREIGN PATENT DOCUMENTS

AT   512619 B1   2/2015
CN   1820184 A   8/2006
(Continued)

*Primary Examiner* — Harshad R Patel
*Assistant Examiner* — Nigel H Plumb
(74) *Attorney, Agent, or Firm* — Norman B. Thot

(57) ABSTRACT

A device for measuring flow processes of fluids includes an inlet, an outlet, a housing in which is arranged a drivable positive displacement flow meter which includes a positive displacement chamber in which a driven impeller is rotatably arranged, a first supply duct connecting the displacement chamber with the inlet, a first discharge duct connecting the displacement chamber with the outlet, a first inlet port, a second supply duct connected to the inlet, a displacement flow meter bypass with a differential pressure sensor, and an evaluation and control unit which controls the displacement flow meter based on a differential pressure applied to the pressure sensor. Cavitation wear of the positive displacement meter is reduced by the first supply duct opening into a front of the displacement chamber via the first inlet port, and the second supply duct opening into a rear of the displacement chamber via a second inlet port.

12 Claims, 4 Drawing Sheets

(51) Int. Cl.
*F04C 2/344* (2006.01)
*G01F 3/10* (2006.01)
*G01F 15/02* (2006.01)

(52) U.S. Cl.
CPC ........ *G01F 15/026* (2013.01); *F04C 2220/24* (2013.01); *F04C 2270/16* (2013.01)

(58) Field of Classification Search
CPC .......... G01F 15/026; G01F 15/00; G01F 3/14; G01F 3/04; G01F 3/10; F02M 65/00
See application file for complete search history.

(56) References Cited

U.S. PATENT DOCUMENTS

| | | | |
|---|---|---|---|
| 4,255,093 | A | 3/1981 | Erikson |
| 2006/0201244 | A1 | 9/2006 | Metzler et al. |
| 2010/0037705 | A1 | 2/2010 | Wakamatsu |
| 2015/0369646 | A1 | 12/2015 | Derschmidt |
| 2019/0145408 | A1* | 5/2019 | Derschmidt .............. F04C 2/10 73/861 |

FOREIGN PATENT DOCUMENTS

| | | |
|---|---|---|
| DE | 1 798 080 B1 | 10/1973 |
| DE | 103 31 228 B3 | 1/2005 |
| EP | 2 124 022 A1 | 11/2009 |
| FR | 2 452 015 | 10/1980 |
| GB | 2 185 785 A | 7/1987 |
| WO | WO 2014/118045 A1 | 8/2014 |
| WO | WO 2014/206767 A1 | 12/2014 |

\* cited by examiner

BIDIRECTIONALLY FLOW-IMPINGED DEVICE FOR MEASURING FLOW PROCESSES OF FLUIDS

CROSS REFERENCE TO PRIOR APPLICATIONS

This application is a U.S. National Phase application under 35 U.S.C. § 371 of International Application No. PCT/EP2016/071769, filed on Sep. 15, 2016 and which claims benefit to Austrian Patent Application No. A 602/2015, filed on Sep. 15, 2015. The International Application was published in German on Mar. 23, 2017 as WO 2017/046209 A1 under PCT Article 21(2).

FIELD

The present invention relates to a device for measuring flow processes of fluids, the device comprising an inlet, an outlet, a drivable positive displacement flow meter arranged in a housing in which a positive displacement chamber is formed, in which at least one driven impeller is rotatably arranged, the positive displacement chamber being fluidically connected to the inlet via a first supply duct and to the outlet via a first discharge duct, a bypass that allows the positive displacement flow meter to be bypassed, a differential pressure sensor which is placed in the bypass, and an evaluation and control unit that allows the drivable positive displacement flow meter to be controlled in accordance with the differential pressure applied to the differential pressure sensor.

BACKGROUND

Such devices have been known for several years and are used, for example, to inject a quantity measurement in internal combustion engines.

The original version of such a device for through-flow measurement was described in DE-AS 1 798 080. This electronically controlled flow meter comprises a main conduit with an inlet and an outlet, in which a rotary positive displacer in the form of a gear pump is arranged. A bypass runs parallel to the main conduit, via which bypass the rotary positive displacer can be bypassed and in which a piston serving as a differential pressure sensor is arranged in a measuring chamber. The excursion of the piston in the measuring chamber is measured using an optical sensor to determine the flow rate. The rotational speed of the gear pump is constantly readjusted via an evaluation and control unit based on this signal, the readjustment being such that the piston is always returned to its initial position, if possible, so that only small flows are generated in the bypass. The flow rate within a predefined time interval is calculated in this manner from the number of rotations or partial rotations of the gear pump measured by an encoder and from the known delivery quantity of the gear pump per revolution.

A flow quantity measuring device of this structure is also described in DE 103 31 228 B3. For determining the exact injection quantity profiles, the gear pump is set to a constant rotational speed prior to the start of each injection, so that the movement of the piston is measured subsequently, with this excursion being used to determine the injection profiles. A pressure sensor and a temperature sensor are also arranged in the measuring chamber, the measuring values of which are also supplied to the computing unit to calculate and to correct the injection quantity profiles.

It is also known to measure the excursion not via an optical sensor, but with a magneto-resistive sensor which corresponds with a permanent magnet arranged in the piston. Such a flow meter is described in AT 512619 B1.

In these flow quantity measuring devices use gear pumps which have two meshing gears arranged side by side, which gears are arranged in a pump chamber supplied with fluid via an inlet port, which fluid leaves the pump chamber via an outlet port. In order to exactly determine the quantity conveyed, as is required when used in flow meters, it is necessary, however, to be able to associate each revolution of the gears with an exact volume flow conveyed. Cavitation occurring in the inlet-side region as well as local pressure peaks in the region of the teeth in the outlet-side region and resulting wear may cause measuring errors during longer periods of operation.

SUMMARY

An aspect of the present invention is to provide a device for measuring flow processes of fluids which allows the flow profiles to be determined in a constantly exact manner over a long service life. An aspect of the present invention is to reduce cavitation at the positive displacer teeth and a resulting wear.

In an embodiment, the present invention provides a device for measuring flow processes of fluids which includes an inlet, an outlet, a housing, a drivable positive displacement flow meter arranged in the housing, the drivable positive displacement flow meter comprising a positive displacement chamber formed therein in which at least one driven impeller is rotatably arranged, a first supply duct fluidically connecting the positive displacement chamber with the inlet, a first discharge duct fluidically connecting the positive displacement chamber with the outlet, a first inlet port via which the first supply duct is configured to open into a front of the positive displacement chamber, a second inlet port, a second supply duct fluidically connected to the inlet, a bypass configured to bypass the drivable positive displacement flow meter, a differential pressure sensor arranged in the bypass, and an evaluation and control unit configured to provide a control of the drivable positive displacement flow meter based on a differential pressure applied to the differential pressure sensor. The second supply duct is configured to open into a rear of the positive displacement chamber via the second inlet port.

BRIEF DESCRIPTION OF THE DRAWINGS

The present invention is described in greater detail below on the basis of embodiments and of the drawings in which.

DETAILED DESCRIPTION

Figure 1:
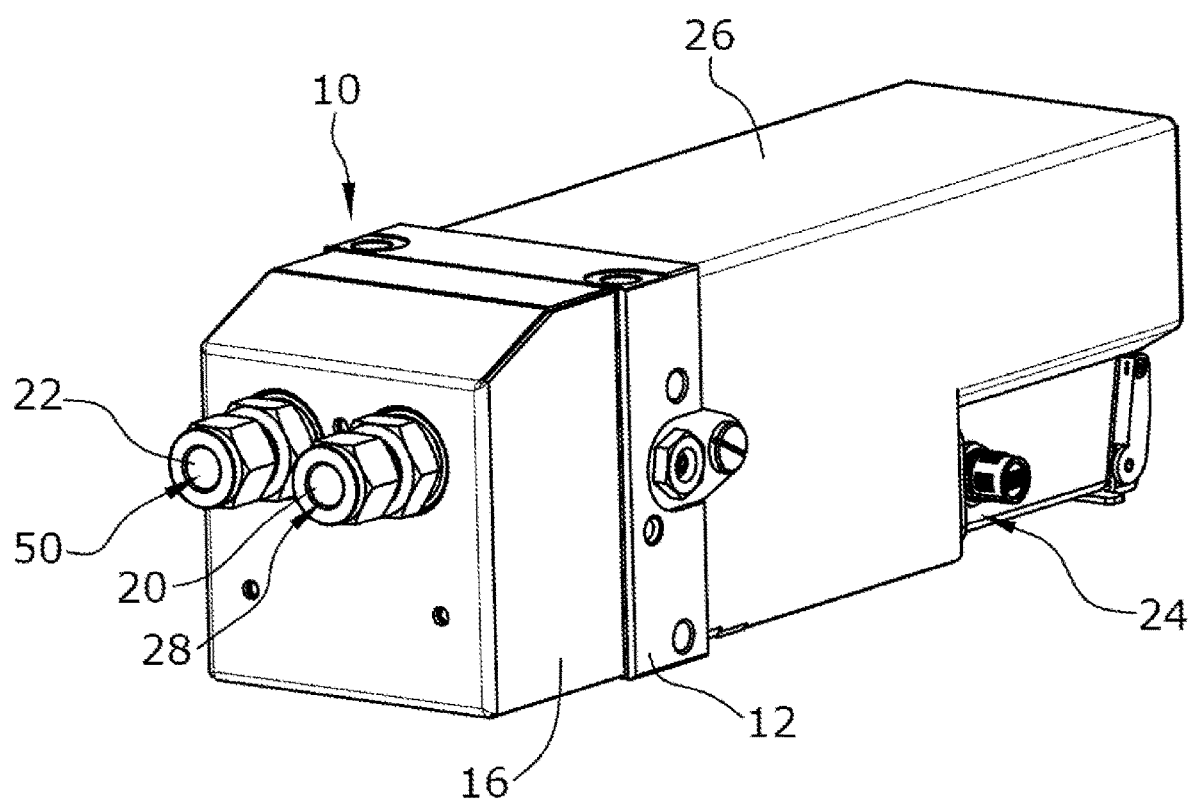
FIG. 1 is a perspective view of the outer side of the device of the present invention.

Because the first supply duct opens into the positive displacement chamber at the front face via a first inlet port and a second supply duct in fluid communication with the inlet opens into the positive displacement chamber on the rear side via a second inlet port, the wear occurring in the region of the impeller opposite the inlet port can be significantly reduced since a clearly more uniform load on the impeller is achieved along its axial dimension. The positive displacement chamber is accordingly filled from both axial sides, whereby the number and intensity of pressure surges occurring are reduced at the same hard surface of the impeller.

In an embodiment of the present invention, the first discharge duct can, for example, open into the positive displacement chamber at the front face via a first outlet port and a second discharge duct opens into the positive displacement chamber on the rear side via a second outlet port. A one-sided load on the impeller, caused by cavitation, is accordingly prevented at the pressure side of the positive displacement meter, where a higher load exists due to the higher feed pressure, and an ongoing cavitation-induced deterioration caused by axially one-sided load is correspondingly counteracted.

In an embodiment of the present invention, the housing can, for example, have a bipartite structure, wherein the positive displacement chamber is arranged in the first housing part, the chamber being closed by a second housing part in which the front-face inlet port and/or outlet port is arranged and in which a measuring chamber of the differential pressure sensor is arranged. Such a separation of the housing parts simplifies assembly and allows for good accessibility. The necessary sealing planes are reduced to a minimum, since the connection between the measuring chamber and the positive displacement chamber can be made through ducts formed in the second housing part, whereby additional conduits can be omitted.

In an embodiment of the present invention, the inlet ports and/or the outlet ports at the front face and the rear side of the housing delimiting the positive displacement chamber can, for example, have a kidney-shaped design. This achieves a uniform filling of the pump chamber while at the same time significantly reducing occurring pressure surges.

In an embodiment of the present invention, the positive displacement flow meter can, for example, be designed as a gear pump and the kidney-shaped inlet openings and/or outlet openings extend radially outward to the tooth roots of the impeller. Pressure surges and cavitations resulting therefrom are thereby further reduced and the filling of the positive displacement chamber is improved.

Further advantages are obtained when the inlet port and/or the outlet port on the front face of the positive displacement chamber is formed as a mirror image of the inlet port and/or the outlet port on the rear side of the positive displacement chamber. A change of the supply direction or of the proportions flowing in or out via the first or the second inlet or outlet port thus has no influence on the inflow or outflow geometries of the flows, whereby wear caused by non-uniform loads on the front or the rear side is avoided.

A particularly simple supply without any further connections is obtained when the first supply duct and the second supply duct and/or the first discharge duct and the second discharge duct are in fluid communication with each other via connection ducts arranged in the housing, and both supply ducts and/or discharge ducts are in fluid communication with the common inlet and/or outlet formed at the housing. The number of external conduits thus remains limited to a necessary minimum. Assembly is thereby simplified.

The inlet ports and/or outlet ports into the positive displacement chamber are advantageously milled in at the front and rear delimiting walls. These walls are easily accessible so that the ports can be made at low cost by milling.

In an embodiment of the present invention, a sleeve can, for example, be arranged in the first housing part, which sleeve forms the positive displacement chamber and which is inserted into a corresponding receiving opening of the first housing part. This facilitates the manufacture of the necessary connection ducts as well as of the inlet and outlet ports formed in the rear side. It is also possible to replace the sleeve in case of damage without having to replace the entire first housing part. More valuable materials with improved sliding properties can also be used for the relatively small sleeve without causing a significant increase in manufacturing costs. It is also possible to increase strength by using corresponding materials.

A particularly manufacture is obtained when the sleeve comprises the wall delimiting the positive displacement chamber at the rear, in which wall the second inlet port and/or the second outlet port are formed, since a corresponding processing of the sleeve can be performed with considerably less effort due to the good accessibility of all surfaces.

In an embodiment of the present invention, the second supply duct and the second discharge duct can, for example, be formed at least in part in the wall delimiting the positive displacement chamber on the rear side and in the radially delimiting outer wall of the sleeve. These ducts can be formed by bores easily made in the walls. Compared to forming the ducts in the first housing part, it is not necessary to close the ducts by additional stoppers or the like. It is instead possible to seal these ducts by simply interposing an axial sealing ring between the housing parts and the sleeve. Assembly is thereby clearly facilitated.

A particularly advantageous development of the present invention is obtained by forming groves at the radial outer side of the radially delimiting outer wall of the sleeve, which grooves form a section of the second supply duct and the second discharge duct which are closed radially outward by the first housing part. These groves may be milled and form a particularly simple fluidic connection between the front face and the rear side of the positive displacement chamber for a two-side supply of the chamber with fluid.

A device for measuring flow processes of fluids is thus provided with which the cavitation occurring and the wear resulting from the cavitation due to the high pressure loads occurring at the impellers can be significantly reduced. This leads to a longer service life of the device and, above all, to measuring results that are very exact over the entire service life so that it is possible to also measure time-resolved flow processes with high accuracy over a long period of time. The device is at the same time easy to manufacture and assemble so that no additional costs are incurred despite the extension of service life.

The device of the present invention for measuring flow processes of fluids will be described hereunder with reference to a non-restrictive embodiment shown in the drawings.

FIG. 1 shows the outer side of a device of the present invention for measuring time-resolved flow processes. The device of the present invention comprises a housing 10 of a bipartite structure, wherein a positive displacement flow meter 14 (see FIG. 4) is arranged in the first housing part 12, and a differential pressure sensor 18 (see FIG. 2), as well as an inlet 20 and an outlet 22, are formed in the second housing part 16. A drive motor of the positive displacement flow meter 14, as well as the evaluation and control unit 24 are arranged inside a cover 26 that, like the second housing part 16, is fastened to the first housing part 12.

Figure 2:
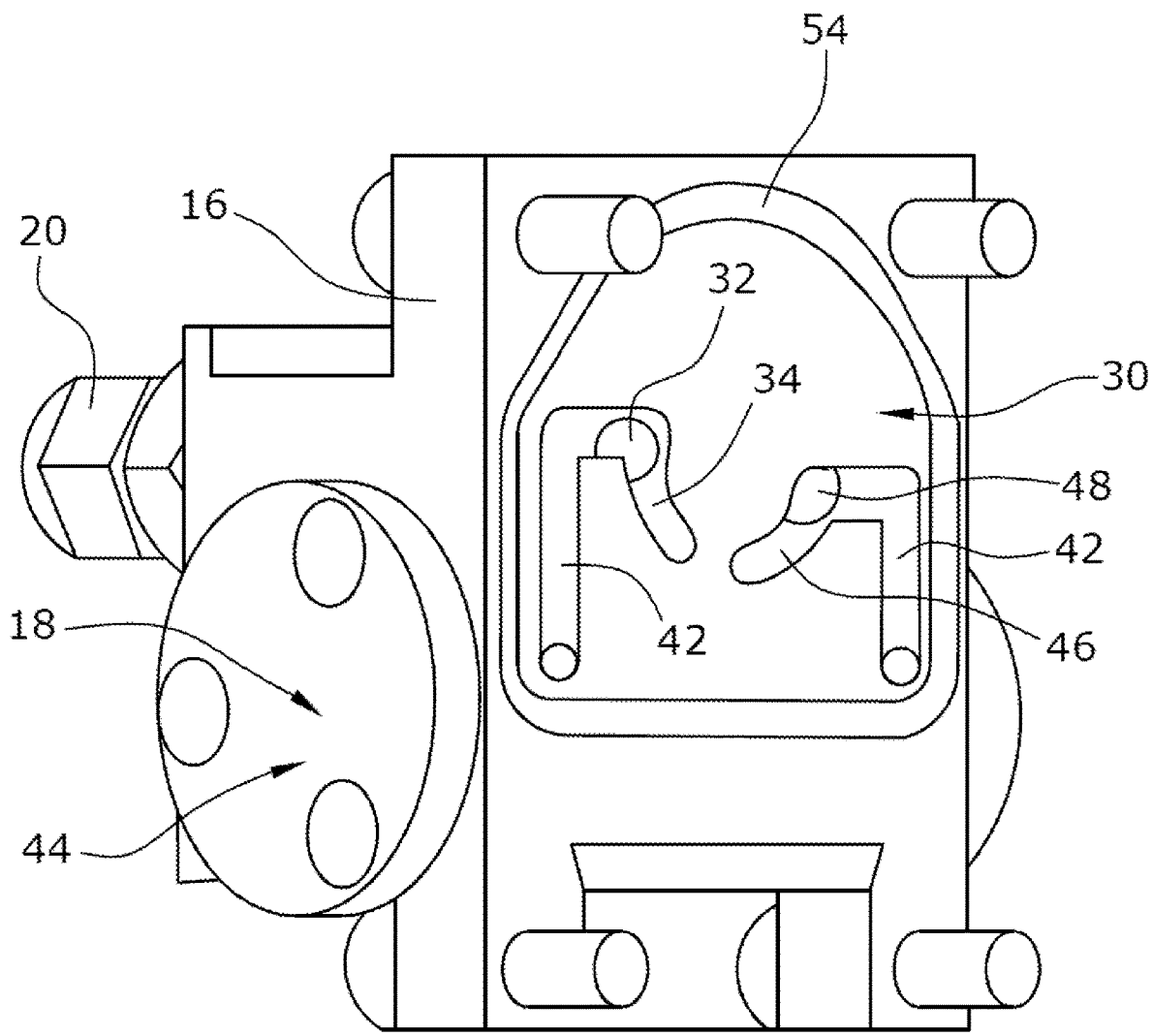
FIG. 2 is a perspective view of the housing part of the device of the present invention shown in FIG. 1, the housing part forming a front face of the positive displacement chamber.

FIG. 2 shows the second housing part 16. Fuel flows via the inlet 20 into a first connection duct 28 (see FIG. 1) serving as an inflow, the first connection duct 28 extending through the second housing part 16 up to the front-face delimiting wall 30 thereof. A plurality of further ducts is milled in this front-face delimiting wall 30. A first duct leading into the radially inner region serves as a first supply duct 32 and opens in a first inlet port 34 which is of a kidney-shaped design and leads into a positive displacement chamber 36 of the positive displacement flow meter 14 which can be seen in FIGS. 3 and 4. A second supply duct 38 is formed in the first housing part 12 axially opposite the first connection duct 28. According to FIG. 2, a first section of a bypass 42 first extends radially outward from the end of the first connection duct 28, then extends downward and thereafter extends axially into the second housing part 16, the section leading into a measuring chamber 44 of the differential pressure sensor 18. A second section of the bypass 42, which corresponds to the first section, extends on the radially opposite side of the second housing part 16 from the side of a piston arranged in the measuring chamber 44 towards the outlet 22, which side is located opposite the first section of the bypass 42. The piston has the same specific weight as the measuring fluid, i.e., as the fuel, and is of cylindrical shape like the measuring chamber 44. The measuring chamber 44 thus has an inner diameter that substantially corresponds to the outer diameter of the piston.

Fuel can flow from the positive displacement chamber 36 into a first kidney-shaped outlet port 46, which in turn opens into a first discharge duct 48 which is in fluid communication with the outlet 22 via a second connection duct 50 (see FIG. 1) extending through the second housing part 16. This second connection duct 50 serving as a discharge is also in fluid communication with a second discharge duct 52 formed in the first housing part 12 and located opposite the second connection duct 50. An axial groove 54 is also formed in the front-face delimiting wall 30, which surrounds the ducts formed in the second housing part 16 and serves to receive a seal (not shown in the drawings) which abuts on the first housing part 12 after assembly so that a tight connection of both the first housing part 12 and the second housing part 16 is established.

Figure 3:
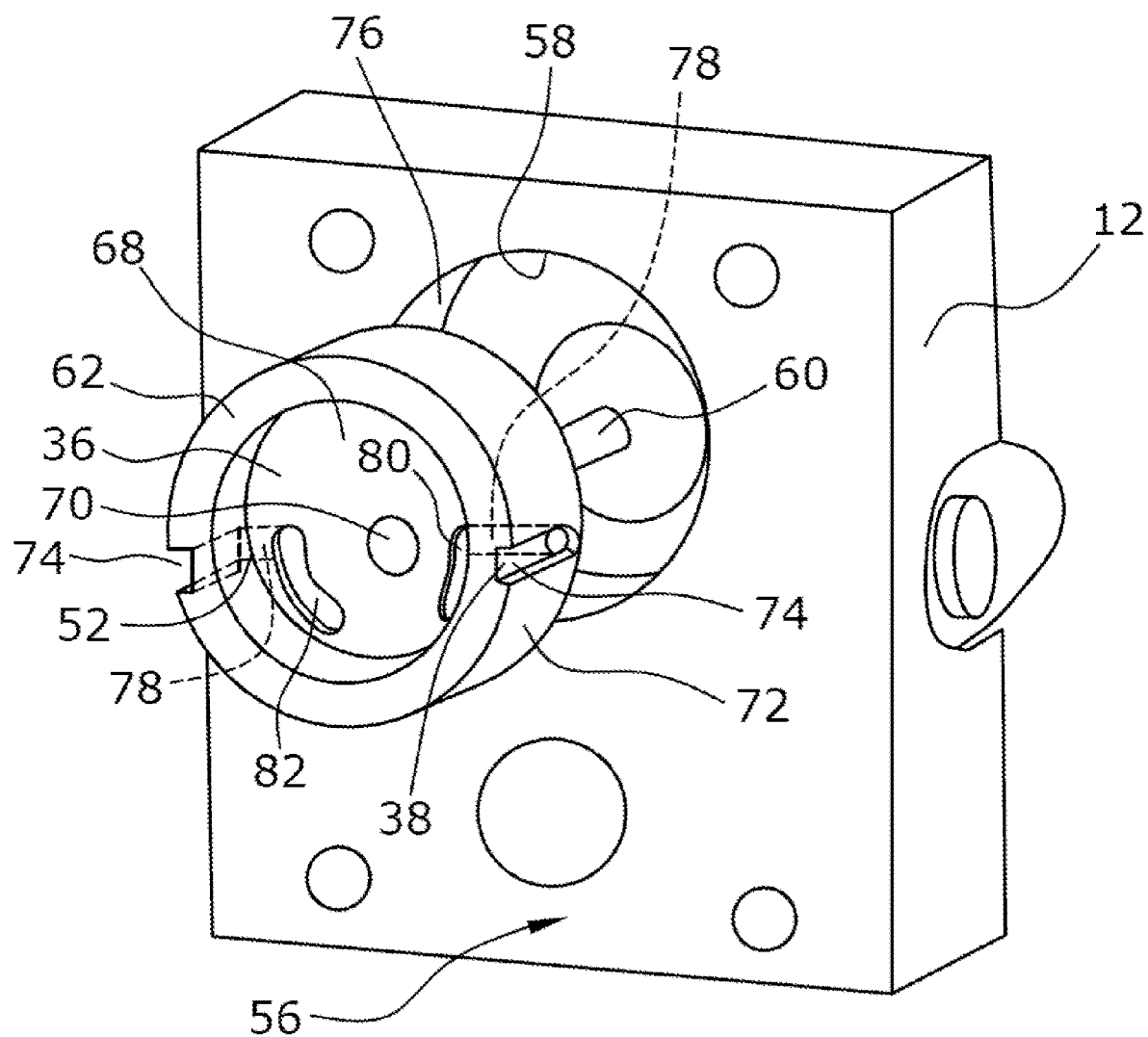
FIG. 3 is a perspective view of the housing part of the device of the present invention shown in FIG. 1, the housing part forming or receiving the positive displacement chamber.

FIG. 3 shows the first housing part 12 in a view on a contact surface 56 by which the first housing part 12 abuts against the front-face delimiting wall 30 of the second housing part 16 that delimits the positive displacement chamber 36 on the front side. A receiving opening 58 is formed in the first housing part 12, into which receiving opening 58 a drive shaft 60 of the drive motor of the positive displacement flow meter 14 protrudes. A sleeve 62 is set into this receiving opening 58, which sleeve 62 serves as the positive displacement chamber 36 and correspondingly receives an inner gear 64 serving as the impeller, as well as an outer gear 66 of the positive displacement flow meter 14. The sleeve 62, which is essentially pot-shaped, correspondingly comprises a passage bore 70 in its wall 68 delimiting the positive displacement chamber 36 on the rear side, the drive shaft 60 protruding into the positive displacement chamber 36 through the passage bore 70.

In its radially delimiting outer wall 72, two grooves 74 are formed in the outer circumference, which two grooves 74 serve as sections of the second supply duct 38 and the second discharge duct 52, and which open at the front face into the first connection duct 28 and the second connection duct 50, and the first supply duct 32 and the first discharge duct 48 of the second housing part 16, respectively. These two grooves 74 are closed radially by an inner wall 76 of the receiving opening 58. On the side opposite of the second housing part 16, the two grooves 74 respectively open into a transversal bore 78 formed in the wall 68 of the sleeve 62 and the bore ends opposite the respective groove 74 open into a second inlet port 80 and a second outlet port 82, respectively, leading to the positive displacement chamber 36. This second inlet port 80 is kidney-shaped, as is the second outlet port 82, wherein, with respect to a cross section perpendicular to the rotational axis of the inner gear 64 and of the outer gear 66, the second inlet port 80 is arranged in a mirror-inverted manner with respect to the front-face first inlet port 34 and the second outlet port 82 is arranged in a mirror-inverted manner with respect to the first kidney-shaped outlet port 46.

Figure 4:
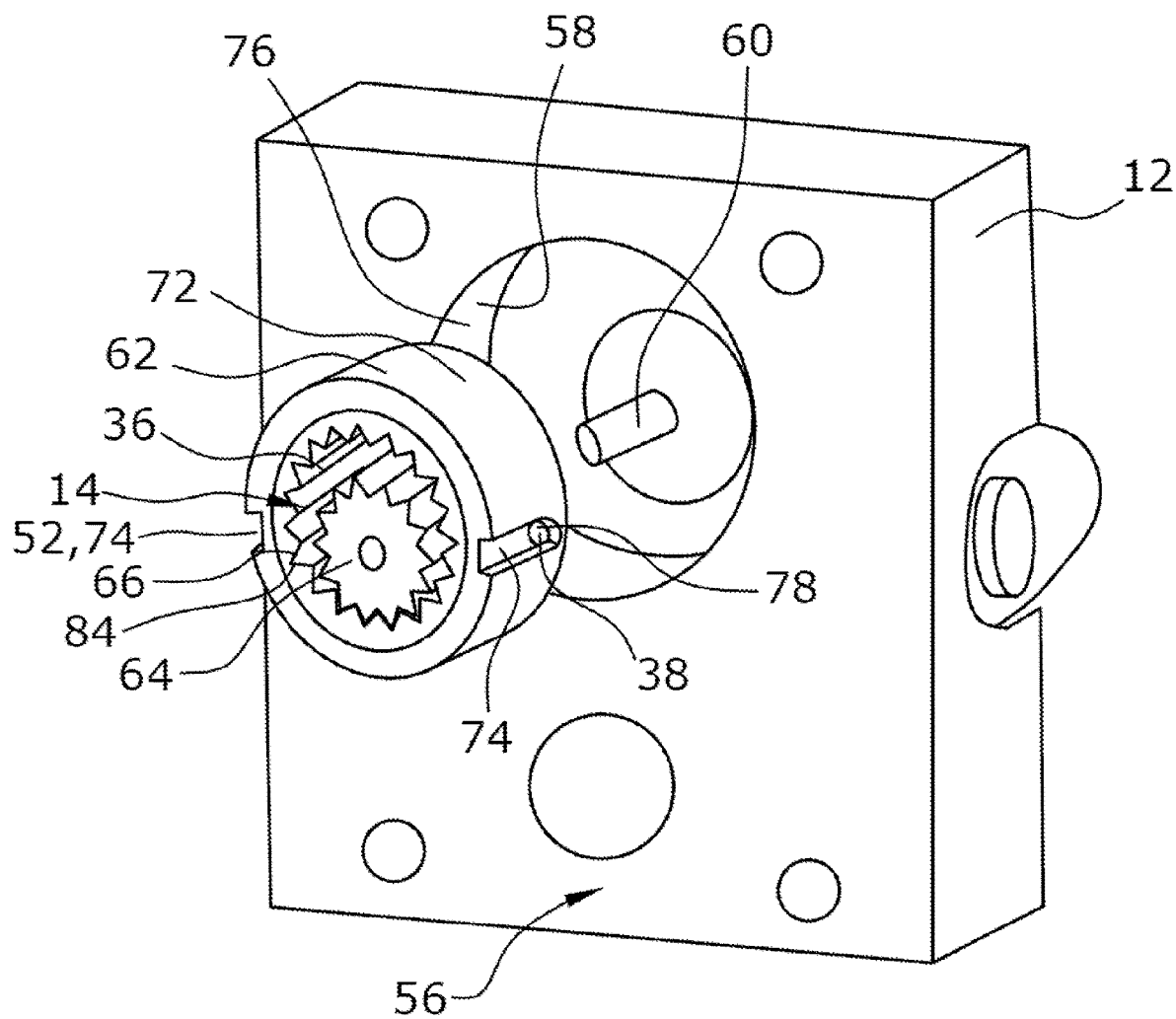
FIG. 4 shows the view in FIG. 3 with the positive displacement meter.

FIG. 4 shows the sleeve 62 with the inner gear 64 serving as a drivable impeller and the outer gear 66 radially supported in the sleeve 62. The outer circumferences of the kidney-shaped first inlet port 34 and second inlet port 80, as well as of the first kidney-shaped outlet port 46 and the second kidney-shaped outlet port 82 extend so far towards the radially delimiting outer wall 72 of the sleeve 62 that they open as precisely as possible at tooth roots 84 (not shown in the drawings) of the outer gear 66.

In operation of the device for measuring flow processes, fuel reaches the inlet 20 via a high pressure pump and one or a plurality of injection valves and flows on to the first supply duct 32 and the second supply duct 38 via the first connection duct 28 serving as an inflow, and into the positive displacement chamber 36 via the first inlet port 34 and the second inlet port 80, whereby the chamber is filled both from the front and the rear side. After having been conveyed by the rotation of the driven impeller 63, the fuel leaves the positive displacement chamber 36 via the first kidney shaped outlet port 46 and the second kidney-shaped outlet port 82 and flows back via the first discharge duct 48 and the second discharge duct 52 to the second connection duct 50 serving as the outflow, so as to then leave the device via the outlet 22.

Due to the fuel being conveyed via the positive displacement flow meter 14, as well as to the injection of the fuel into the inlet 20 and to the fluidic connection of the inlet 20 with a first side of the piston, as well as of the outlet 22 with the opposite side of the piston via the bypass 42, a pressure difference can be created between the front and the rear side of the piston which causes an excursion of the piston from its rest position. The excursion of the piston is accordingly a measure of the prevailing pressure difference. A path sensor is therefore arranged at the measuring chamber 44, which path sensor is operatively connected with the piston and in which the excursion of the piston generates a voltage which is a function of the magnitude of the excursion. This path sensor mounted at the measuring chamber 44 is in particular a magneto-resistive sensor, by which the field strength of a magnet acting thereon is transformed in to a voltage. It is also possible to use light sensors as path sensors.

The path sensor is connected with the evaluation and control unit 24 which receives the values from this path sensor and transmits corresponding control signals to the drive motor which can, for example, be controlled so that the piston is always in a defined initial position. The rotary positive displacement flow meter 14 is thus driven so that the pressure difference which is caused at the piston by the injected fluid is approximately balanced out in a continuous manner by conveying. A pressure sensor and a temperature sensor are also arranged in the measuring chamber 44 which continuously measure the pressures and temperatures prevailing in this region and also transmit these measurements to the evaluation and control unit 24 so that the calculation can take changes in density into account.

The procedure of the measuring is such that, when a total flow rate to be determined is calculated in the evaluation and control unit 24, both a flow rate in the bypass 42 which is generated by the movement or the position of the piston and the volume displaced thereby in the measuring chamber 44, and an actual flow rate of the positive displacement flow meter 14, which can be provided as a gear pump, during a defined time interval are taken into account, and both flow rates are summed to determine the total flow rate.

The determination of the flow rate at the piston is performed, for example, so that, in the evaluation and control unit 24 connected to the path sensor, the excursion of the piston is differentiated and subsequently multiplied by the base surface of the piston so that a volume flow in the bypass 42 in this time interval is obtained.

The flow rate through the positive displacement flow meter 14 can be determined either from the control data obtained or via the rotational speed, if the rotational speed is measured directly at the positive displacement flow meter 14, or at the drive motor, for example, by optical encoders or magneto-resistive sensors.

In this device of the present invention, it has been found that at a flow rate of about 30 l/h, due to the slightly different flow resistances, the fuel flow is divided so that an inflow and conveying primarily occur in the front-face region. However, due to the relatively low pressure differences at this feed rate, there is also a relatively low risk of a cavitation occurring. If, due to greater injection quantities, the flow rate of the positive displacement flow meter 14 is augmented, for example, to about 70 l/h, an increasing filling and conveying also occurs via the rear side of the positive displacement flow meter 14, via which about 40% of the flow rate flows. The vapor cavities in the fuel that cause cavitation are correspondingly also distributed more uniformly over the axial length of the impeller (inner gear 64) and do not accumulate in the region of the front face. Cavitation that occurs is thus distributed more uniformly over the positive displacement chamber 36 and the tendency for cavitation also decreases.

The device of the present invention for measuring flow processes of fluids accordingly significantly reduces the cavitation-induced deterioration in the positive displacement chamber 36 and at the impeller (inner gear 64) so that the positive displacement flow meter 14 is durable for a significantly longer time. The exactness of the measuring results also increases since a volume flow must be associated with each revolution of the positive displacement flow meter 14, which flow, in case of excessive wear, would change during operation due to additional cavities. Another advantage is obtained from the replaceability and the free choice of the material of the sleeve.

It should be clear that the present invention is not limited to the described embodiment, but that various modifications are possible. For example, the arrangement of the ducts and the housing separations can be modified as well as the design of the positive displacement flow meter, which may also be designed, for example, as a double gear pump or a vane pump. It is also possible to directly arrange the positive displacement flow meter in the recess, instead of the sleeve, or to design the sleeve without a rear wall of its own. An improved division of the inflow into the positive displacement chamber is achieved not least already by only forming two inflow ports at the two axially delimiting sides of the positive displacement chamber. Reference should also be had to the appended claims.

What is claimed is:

1. A device for measuring flow processes of fluids, the device comprising:
an inlet;
an outlet;
a housing;
a drivable positive displacement flow meter arranged in the housing, the drivable positive displacement flow meter comprising a positive displacement chamber formed therein in which at least one driven impeller is rotatably arranged;
a first supply duct fluidically connecting the positive displacement chamber with the inlet;
a first discharge duct fluidically connecting the positive displacement chamber with the outlet;
a first inlet port via which the first supply duct is configured to open into a front of the positive displacement chamber;
a second inlet port;
a second supply duct fluidically connected to the inlet, the second supply duct being configured to open into a rear of the positive displacement chamber via the second inlet port;
a bypass configured to bypass the drivable positive displacement flow meter;
a differential pressure sensor arranged in the bypass; and
an evaluation and control unit configured to provide a control of the drivable positive displacement flow meter based on a differential pressure applied to the differential pressure sensor.

2. The device as recited in claim 1, further comprising:
a first outlet port;
a second outlet port; and
a second discharge duct,
wherein,
the first discharge duct is arranged to open into the front of the positive displacement chamber via the first outlet port, and
the second discharge duct is arranged to open into the rear or the positive displacement chamber via the second outlet port.

3. The device as recited in claim 2, wherein,
the differential pressure sensor comprises a measuring chamber,
the housing is provided as a bipartite structure comprising a first housing part and a second housing part,
the positive displacement chamber is arranged in the first housing part,
at least one of the first inlet port and the first outlet port is arranged in the second housing part,
the measuring chamber of the differential pressure sensor is arranged in the second housing part, and
the positive displacement chamber is closed by the second housing part.

4. The device as recited in claim 2, wherein at least one of,
the first inlet port and the second inlet port, and
the first outlet port and the second outlet port,
are formed so as to have a kidney-shape at the front and at the rear of the housing part delimiting the positive displacement chamber.

5. The device as recited in claim 4, wherein,
the at least one driven impeller comprises tooth roots,
the drivable positive displacement flow meter is provided as a gear pump, and
the at least one of,
- the first inlet port and the second inlet port, and
- the first outlet port and the second outlet port, which are formed so as to have the kidney-shape are arranged to extend radially outward to the tooth roots of the at least one driven impeller.

6. The device as recited in claim 2, wherein at least one of the first inlet port and the first outlet port at the front of the positive displacement chamber is formed as a mirror image of at least one of the second inlet port and the second outlet port at the rear of the positive displacement chamber.

7. The device as recited in claim 2, further comprising:
connection ducts arranged in the housing,
wherein,
the inlet and the outlet are each formed at the housing,
at least one of the,
- first supply duct and the second supply duct, and
- the first discharge duct and the second discharge duct, are fluidically connected with each other via the connection ducts arranged in the housing, and
at least one of,
- both the first supply duct and the second supply duct, and
- both the first discharge duct and the second discharge duct, are fluidically connected, via the connection ducts, with at least one of the inlet and the outlet formed at the housing.

8. The device as recited in claim 2, wherein,
the positive displacement chamber comprises a front wall and a rear wall which delimit the positive displacement chamber at the front and at the rear, respectively, and
at least one of,
- the first inlet port and the second inlet port, and
- the first outlet port and the second outlet port, in the positive displacement chamber are milled into the respective front wall and rear wall.

9. The device as recited in claim 8, wherein,
the first housing part comprises a receiving opening, and
a sleeve is configured to form the positive displacement chamber, the sleeve being inserted into the receiving opening.

10. The device as recited in claim 9, wherein,
the sleeve comprises the rear wall that delimits the positive displacement chamber at the rear, and
at least one of the second inlet port and the second outlet port are formed in the rear wall.

11. The device as recited in claim 10, wherein,
the sleeve further comprises a radially delimiting outer wall, and
the second supply duct and the second discharge duct are formed at least in part in the rear wall that delimits the positive displacement chamber at the rear and in the radially delimiting outer wall of the sleeve.

12. The device as recited in claim 11, further comprising:
grooves formed in a radial outer side of the radially delimiting outer wall of the sleeve, the grooves being arranged to form a respective section of the second supply duct and of the second discharge duct which are closed to the radial outer side by the first housing part.

* * * * *